United States Patent
Kobayashi

(10) Patent No.: US 7,675,212 B2
(45) Date of Patent: Mar. 9, 2010

(54) SEALING DEVICE

(75) Inventor: Naoto Kobayashi, Fukushima (JP)

(73) Assignee: NOK Corporation, Tokyo (JP)

( * ) Notice: Subject to any disclaimer, the term of this patent is extended or adjusted under 35 U.S.C. 154(b) by 1027 days.

(21) Appl. No.: 10/571,106

(22) PCT Filed: Sep. 10, 2004

(86) PCT No.: PCT/JP2004/013207

§ 371 (c)(1),
(2), (4) Date: Mar. 8, 2006

(87) PCT Pub. No.: WO2005/026587

PCT Pub. Date: Mar. 24, 2005

(65) Prior Publication Data

US 2007/0024273 A1    Feb. 1, 2007

(30) Foreign Application Priority Data

Sep. 10, 2003   (JP) .............................. 2003-318694

(51) Int. Cl.
*H02J 15/32* (2006.01)

(52) U.S. Cl. ........................ 310/90.5; 277/317; 324/173

(58) Field of Classification Search ............... 310/68 B, 310/90.5; 324/173, 207.25; 384/448; 277/317, 277/551, 562, 571
See application file for complete search history.

(56) References Cited

U.S. PATENT DOCUMENTS 5,575,568 A * 11/1996 Rigaux et al. ................ 384/448
5,969,518 A    10/1999 Merklein et al. ............ 324/173

FOREIGN PATENT DOCUMENTS

| JP | 10-160744 | 6/1998 |
| JP | 10-253647 | 9/1998 |
| JP | 11-023598 | 1/1999 |
| JP | 11-174068 | 7/1999 |
| JP | 11-303879 | 11/1999 |
| JP | 2002-048247 | 2/2002 |

* cited by examiner

*Primary Examiner*—Quyen Leung
*Assistant Examiner*—David W. Scheuermann
(74) *Attorney, Agent, or Firm*—Jacobson Holman PLLC

(57) ABSTRACT

A sealing device in which a magnetic encoder is protected so as to improve detecting precision and reliability, without increasing the number of parts and assembling time and without enlarging a setting space, the sealing device is structured such that a detected portion is arranged in the sealed fluid side of an annular member. A first annular member fitted to a shaft is formed with an axial direction portion and diametrical direction portions extending in the inward and outward diametrical directions from the axial direction portion. One of the diametrical direction portions supports the detected portion in the sealed fluid side. A seal lip is in slidable contact with the other diametrical direction portion for sealing, and the seal portion is formed with the seal lip and the micro space.

9 Claims, 8 Drawing Sheets

PRIOR ART

PRIOR ART

SEALING DEVICE

This is a nationalization of PCT/JP2004/13207 filed 10 Sep. 2004 and published in Japanese.

TECHNICAL FIELD

The present invention relates to a sealing device provided with a magnetic encoder and sealing an annular space formed between an inner member and an outer member which rotate relatively to each other.

BACKGROUND ART

In conventional, in Japanese Unexamined Patent Publication No. 2002-48247, there has been developed a structure in which a magnetic encoder 106 is integrally formed in a sealing device 105 sealing an annular space between a shaft 101 and a housing 102 which rotate relatively to each other via a rolling element 103, as shown in FIG. 7. The sealing device 105 is structured such that first and second annular members 107 and 108 each of which is formed in an L-shaped cross sectional shape are fitly attached to the shaft 101 and the housing 102 respectively, a seal member 109 is provided in the second annular member 108, and a seal lip 110 integrally formed with the seal member 109 is brought into contact with the first annular member 107 with sealing effect, thereby preventing a foreign material from entering from the external and preventing a grease in the inside from flowing out. The magnetic encoder 106 is formed by an elastic body such as a rubber, a resin or the like into which a magnetic material powder is mixed, and is vulcanized and adhered to an outer surface (right side in the drawing) of a flange portion of the first seal annular member 107. The magnetic encoder 106 is structured such that magnetic poles are alternately formed in the circumferential direction by a magnetic field applied from the external, and a rotating speed or the like is detected by sensing a change of the magnetic field generated from the rotating magnetic encoder 106 by means of a magnetic sensor 111 arranged close thereto.

In accordance with this structure, since the magnetic encoder 106 and the magnetic sensor 111 are arranged in an outermost position in the axial direction which is exposed to the atmospheric air, the magnetic encoder 106 and the magnetic sensor 111 are directly exposed to splashing muddy water and a foreign material, and are under the condition of being easily affected by a disturbance such as a magnetic field applied from the external. Accordingly, reduction of the magnetic force and turbulence of the magnetic force are generated, and they are under the condition of hardly to supplying stable magnetic force. Further, if a foreign material intrudes so as to attach to a portion between the magnetic encoder 106 and the magnetic sensor 111, the magnetic encoder 106 and the magnetic sensor 111 are damaged due to the foreign material bitten by them with rotational force in the worst case and there is a risk that a detecting number of the rotation is led into error.

As a countermeasure thereof, in Japanese Unexamined Patent Publication No. 11-303879, there is employed a method of wrapping the magnetic encoder 106 by a protection plate 113 arranged in the outside in the axial direction of the magnetic encoder 106 so as to protect the magnetic encoder 106, as shown in FIG. 8. However, since the protecting plate 113 is newly provided, a number of parts and an assembling man-hour are increased. Further, since a setting space must be enlarged in the axial direction, it is hard to attach to a narrow space.

DISCLOSURE OF THE INVENTION

Problem to be Solved by the Invention

The present invention is made by taking the points mentioned above into consideration, and an object of the present invention is to provide a sealing device in which a magnetic encoder can be protected so as to improve detecting precision by a magnetic sensor and to give a high reliability without increasing the number of parts and assembling man-hour and without enlarging a setting space.

Means for Solving the Problem

In order to achieve the object mentioned above, in accordance with a first aspect of the present invention, there is provided a sealing device comprising:

a first annular member fitly attached to any one member of two members which are rotatable relatively to each other coaxially;

a second annular member fitly attached to the other member of the two members; and a seal portion provided between the first and second annular members and sealing an annular gap between the two members, wherein a magnetized detected portion to be detected by a detecting means provided in the no sealed fluid side is provided in the sealed fluid side of the first annular member, whereby a relative rotation of the two member can be detected.

Accordingly, since the detected portion is provided in the sealed fluid side (the inner side) of the first annular member, it is possible to prevent the detected portion from being directly affected by the disturbance such as the exposure to splashing muddy water, a foreign material, a magnetic field from the external and the like, it is possible to supply stable magnetic force, and it is possible to improve detecting precision by the detecting means. Further, since the detecting means is structured such as to be arranged in the no sealed fluid side (the external side), that is, in the external side of the sealing device, it is not necessary that the detecting means is provided in the sealing device, and it is possible to simplify the structure of the sealing device.

Further, in accordance with a second aspect of the present invention, there is provided a sealing device as recited in the first aspect, wherein the first annular member has an axial direction portion fitly attached to the one member and diametrical direction portions extending in the inward diameter direction and in the outward diameter direction in the no sealed fluid side from the axial direction portion, and is made of a non-magnetic material, any one diametrical direction portion of the diametrical direction portions supports the detected portion arranged in a recess portion formed in an axial end portion of the one member in the sealed fluid side, and the other diametrical direction portion is brought into contact with sealing effect with a seal lip of the seal portion fixed to the second annular member.

Accordingly, since it is possible to make the axial position of the outer surface of the one diametrical direction portion supporting the detected portion identical with the axial position of the outer surface of the other diametrical direction portion and the positions of the outer side end surfaces in the axial direction of two members, it is not necessary to enlarge the space in the axial direction, and it is possible to attach the sealing device in a narrow space range.

Further, since the first annular member has the diametrical direction portions extending to the inward diametrical direction and the outward diametrical direction, and the one diametrical direction portion among them supports the detected portion arranged within the recess portion formed in the one axial end surface of the one member in the inner portion side, it is possible to keep a function of sealing the detected portion from muddy water and a foreign material, and it is possible to keep a function of inhibiting intrusion of a foreign material into an inner portion from the external by bringing the seal lip member into contact with sealing effect with the inner surface of the other diametrical direction portion. In other words, since the first annular member keeps a function of serving as a detected portion protecting member in addition to the function of serving as a constituting member of the sealing device, it is possible to protect the detected portion without increasing the number of the parts and the assembling man-hour. In particular, since the detected portion is held between the first annular member of the non-magnetic material and the one member, it is possible to supply stable magnetic force without being affected by the disturbance such as muddy water, a foreign material, an external magnetic field and the like from the external.

Further, in accordance with a third aspect of the present invention, there is provided a sealing device as recited in the second aspect, wherein an axial position of an outer surface of one diametrical direction portion supporting the detected portion in the sealed fluid side is positioned in the sealed fluid side from an axial position of an outer surface of the other diametrical direction portion.

Accordingly, since the position of the outer surface of the one diametrical direction portion supporting the detected portion is positioned in the inner side than the position of the outer surface of the other diametrical direction portion, and the positions of the axial outer side end surfaces of two members, it is possible to arrange the detecting means within the recess portion formed in the axial end surface of one member, and it is possible to protect the detecting means as well as the detected portion from the disturbance such as muddy water, a foreign material or the like.

Further, in accordance with a fourth aspect of the present invention, there is provided a sealing device as recited in the second aspect, wherein the axial direction portion of the first annular member fitly attached to the one member is folded back.

Further, in accordance with a fifth aspect of the present invention, there is provided a sealing device as recited in the third aspect, wherein the axial direction portion of the first annular member fitly attached to the one member is folded back.

Accordingly, in the sealing device in accordance with the fourth and fifth aspects provided with the structure mentioned above, since the first annular member is folded back in a cylinder portion fitted to the one member, it is possible to extend a service life of the sealing device.

Further, in accordance with a sixth aspect of the present invention, there is provided a sealing device as recited in the first aspect, wherein the seal portion further comprises:

a seal lip provided in at least any one of the first and second annular members, and brought into contact with sealing effect with at least the other of the first and second annular members; and a micro space provided in the no sealed fluid side from the seal lip, and formed by the first annular member being positioned close to at least any one of the second annular member and the other member.

Accordingly, since the seal portion sealing the annular gap between two members is structured by the seal lip and the micro gap provided in the no sealed fluid side from the seal lip, it is possible to dramatically improve a sealing performance, in particular, muddy-water-proof. Therefore, it is possible to more securely protect the detected portion provided in the sealed fluid side, it is possible to prevent a direct affect by the disturbance due to a foreign material, muddy water, an external magnetic field and the like from the external, it is possible to supply stable magnetic force, and it is possible to improve detecting precision by the detecting means.

Further, in accordance with a seventh aspect of the present invention, there is provided a sealing device as recited in the sixth aspect, wherein the one member is provided in an inner peripheral side of the other member, and the first annular member is provided with an axial direction portion arranged close to the detecting means, in the outer peripheral side than the detecting means.

Accordingly, it is possible to protect the detecting means by arranging the detecting means in a recess portion formed by the axial direction portion and the diametrical direction portions of the first annular member. Further, it is possible to protect the detecting means from a foreign material, muddy water and the like intruding from the outer peripheral side, by arranging the detecting means and the axial direction portion close to each other.

EFFECT OF THE INVENTION

The present invention can obtain the following effects.

Since the sealing device in accordance with the present invention provided with the structure mentioned above is structured such that the detected portion is positioned in the sealed fluid side from the annular member, it is possible to protect the detected portion from the influence of the disturbance such as muddy water, a foreign material, an external magnetic field or the like, and it is possible to supply stable magnetic force.

Further, since one annular member keeps the function of serving as the detected portion protecting member in addition to the function of serving as the constituting member of the sealing device, it is possible to protect the detected portion without increasing the number of the parts and the assembling man-hour.

Further, it is possible to protect the detecting means as well as the detected portion from a foreign material and muddy water coming from the external.

BEST MODE FOR CARRYING OUT THE PRESENT INVENTION

A description will be in detail given below of preferable embodiments of the present invention in exemplification of it with reference to the accompanying drawings. However, the scope of the invention is not limited to the contents described in those embodiments unless a definite description exists.

First Embodiment

Figure 1:
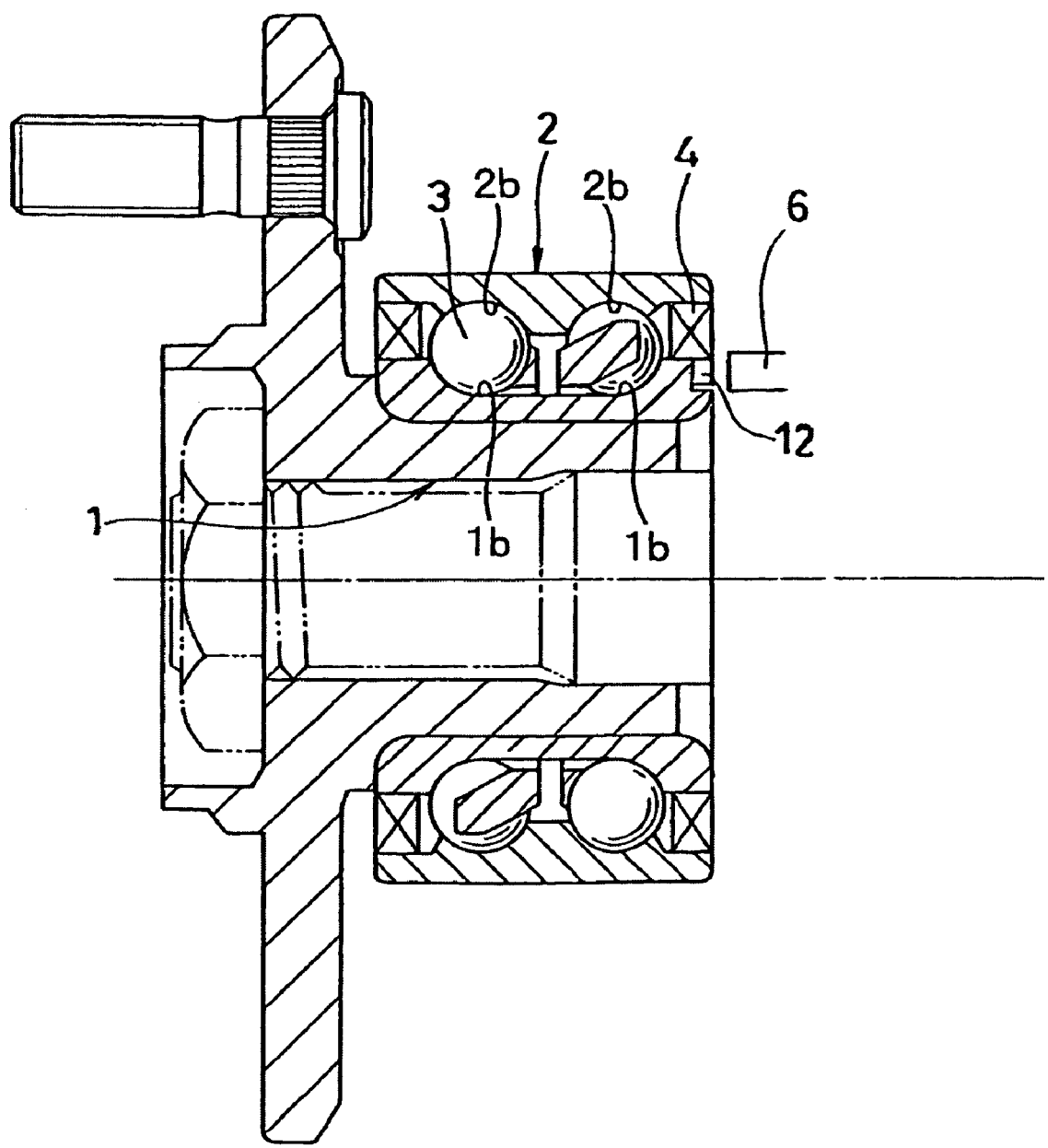
FIG. 1 is a cross sectional view of a main portion of a tire wheel support apparatus in which a sealing device is installed.

As shown in FIG. 1, the sealing devices are attached to both ends so as to seal an annular space formed by an inner member 1 and an outer member 2 which rotate relatively to each other via a rolling element 3. A sealing device 4 in one end is provided with a magnetic encoder 12 measuring a rotating speed. The inner member 1 and the outer member 2 have raceway surfaces of the rolling element 3, and each of the raceway surfaces is formed in a groove shape. The inner member 1 and the outer member 2 may be single elements of a bearing inner ring and a bearing outer ring, or assembled members of the bearing inner ring and the bearing outer ring with the other parts respectively. Further, the inner member 1 may be a shaft. The sealing device can be used, for example, in a rotating part of a motor vehicle, an electrical appliance, an industrial machinery, a bicycle or the like.

Figure 2:
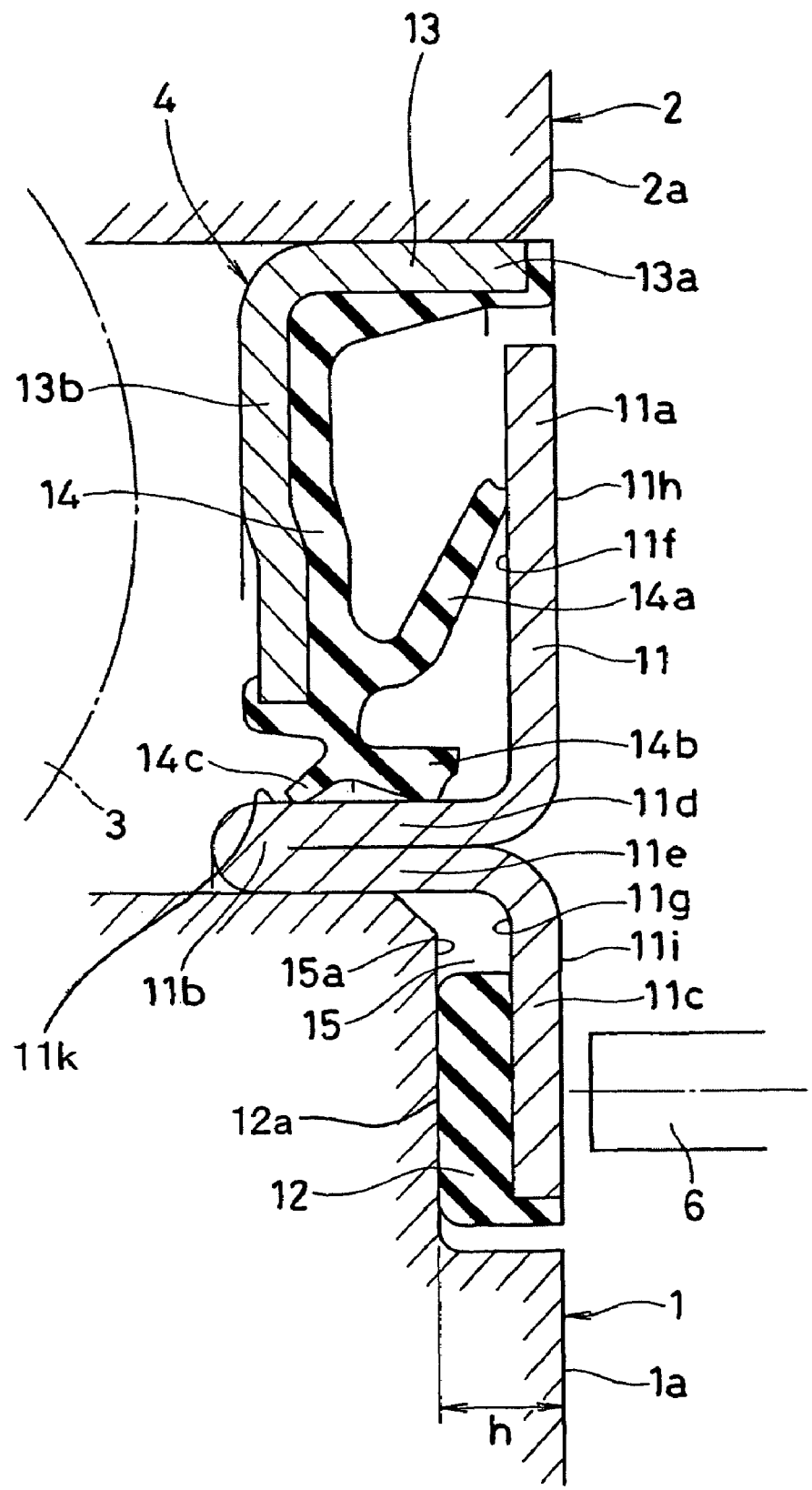
FIG. 2 is a cross sectional view of a sealing device in accordance with a first embodiment of the present invention.

As shown in FIG. 2, the sealing device 4 seals an annular gap between the housing 2 serving as the other member of two members arranged so as to be relatively rotatable coaxially, and the shaft 1 serving as one member inserted into an axial hole of the housing 2, and is provided with a magnetic encoder 12 having a detected portion 12a arranged within a recess portion 15 formed in an axial end portion of the shaft 1, a first annular member 11 fitly attached to a peripheral surface of the shaft 1 and having diametrical direction portions (flange portions) 11a and 11c at two positions, a second annular member 13 fitly attached to a diametrical end surface of the housing 2, and a seal member 14 vulcanized and adhered to the second annular member 13.

Figure 3:
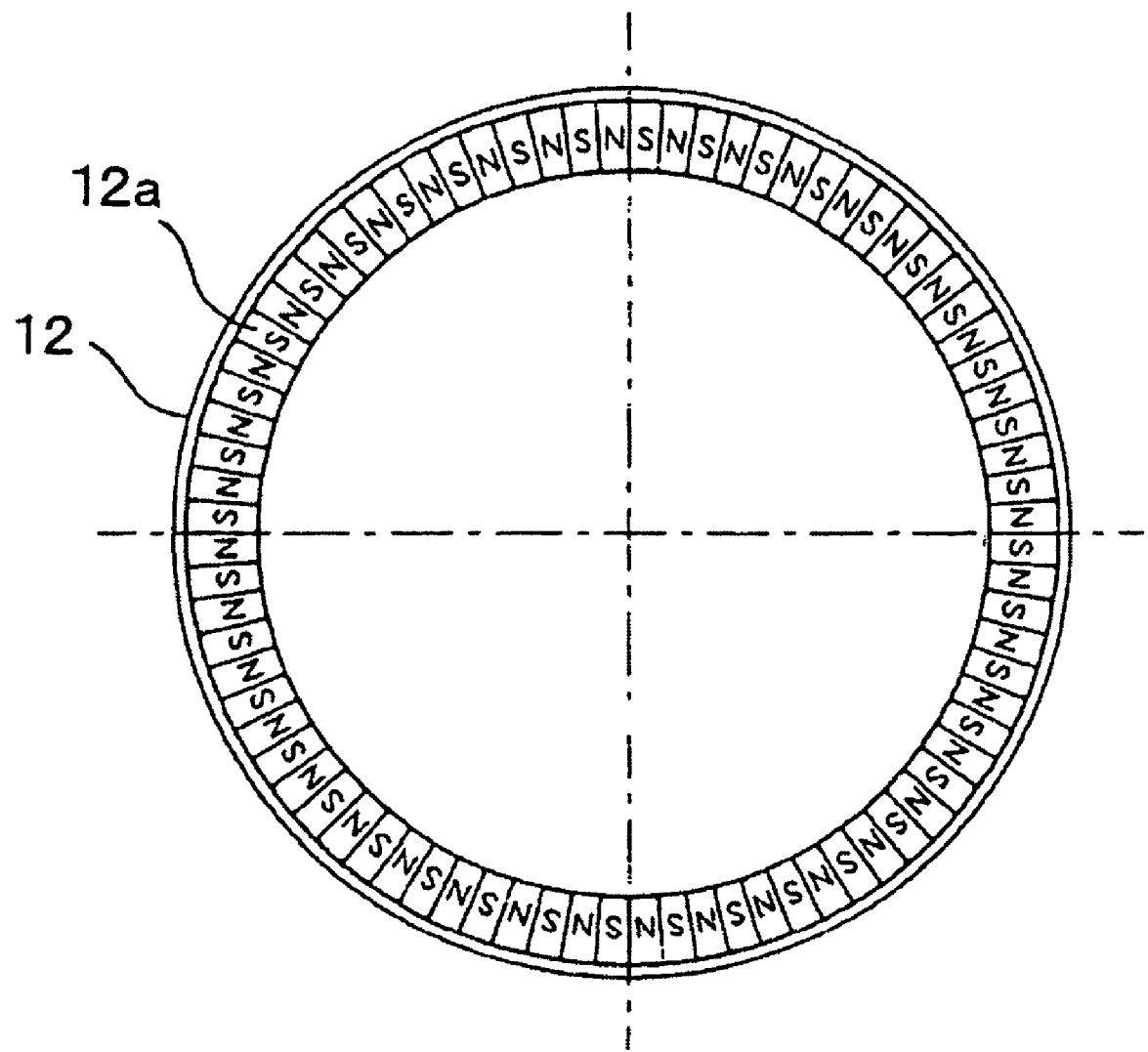
FIG. 3 is a schematic view for explaining a multipolarized detected portion.

The magnetic encoder 12 having the detected portion 12a is arranged within a recess portion 15 formed in the axial end portion of the shaft 1. The magnetic encoder 12 is made by magnetizing after vulcanizing a product obtained by adding a single magnetic material such as ferritic magnetic powder, rare earth magnetic powder, alnico magnetic powder or the like or a mixture thereof to a rubber material. As shown in FIG. 3, magnetic poles are formed alternately in the circumferential direction so as to structure the detected portion 12a. The magnetic sensor 6 is structured by magneto-resistance effect elements arranged close to each other, or the like. A rotating speed or the like is detected by sensing a change of a magnetic field generated from the detected portion 12a of the rotating magnetic encoder 12. The magnetic encoder 12 is in close contact with a bottom surface 15a of the recess portion 15 formed in the axial end portion of the shaft 1, and is supported to an inner surface 11g of the diametrical direction portion 11c for protecting in the first annular member 11 mentioned below in accordance with vulcanizing adhesion.

The magnetic sensor 6 is provided so as to face to the detected portion 12a of the magnetic encoder 12, which is provided in an inner side of the first annular member, via the first annular member. In other words, the magnetic sensor 6 is provided in the axial outer side than the detected portion 12a of the magnetic encoder 12, and is held in the housing 2 side.

The first annular member 11 has the two diametrical direction portions 11a and 11c made by folding back in the axial direction portion (the cylinder portion) 11b fitting to the peripheral surface of the shaft 1, and one diametrical direction portion 11a for sealing forms an approximate inverted-L shape together with an outer diameter portion 11d of the axial direction portion 11b, and forms a seal portion so as to face to the second annular member 13 mentioned below. The other diametrical direction portion 11c for protecting is provided in the outer side in the axial direction than the detected portion 12a of the magnetic encoder 12 and supports the magnetic encoder 12 in such a manner as to cover and protects the magnetic encoder 12 from muddy water and a foreign material. The first annular member 11 is formed by a nonmagnetic material for transmitting a magnetic field generated from the detected portion 12a of the enclosed magnetic encoder 12 to the magnetic sensor 6 to the effective maximum.

The second annular member 13 is formed by an axial direction portion 13a fitted to the housing 2 and a diametrical direction portion 13b extending in the diametrical direction from one end in the axial inner side of the axial direction portion 13a. A seal member 14 made of a rubber-type elastic body is vulcanized and adhered to an inner diameter surface of the axial direction portion 13a of the second annular member 13 and an outer surface of the diametrical direction portion 13b.

The seal member 14 has a seal lip 14a which is in slidable contact with an inner surface 11f of the one sealing diametrical direction portion 11a, and seal lips 14b and 14c which are in slidable contact with an outer diameter surface 11k of the outer diameter portion 11d of the axial direction portion 11b fitted in the peripheral surface of the shaft 1.

In accordance with the first embodiment, since it is possible to make an axial position of an outer surface 11i of the one protecting flange portion 11c supporting the detected portion 12a of the magnetic encoder 12 identical with an axial position of an outer surface 11h of the other sealing flange portion 11a, and positions of an axial end surface 1a of the shaft 1 and an axial end surface 2a of the housing 2, it is not necessary to enlarge a space in the axial direction, and it is possible to attach the sealing device 4 provided with the magnetic encoder 12 in a narrow space range.

Further, since the diametrical direction portions 11a and 11c are provided at two positions in the first annular member 11, and the one protecting diametrical direction portion 11c supports the detected portion 12a of the magnetic encoder 12 in the inner side, it is possible to seal the detected portion 12a of the magnetic encoder 12 from muddy water and a foreign material. Further, since the first annular member 11 is formed by the nonmagnetic material, the first annular member 11 is not affected by the magnetic field, and thus the magnetic encoder 12 can keep the function to supply stable magnetic force. The other sealing diametrical direction portion 11a inhibits intrusion of a foreign material into the inner portion from the external by bringing the seal lips 14a, 14b and 14c into slidable contact, and keeps the function of preventing the grease in the inner portion from flowing out. In other words, since the first annular member 11 corresponding to one member keeps the function serving as the magnetic encoder protecting member in addition to the function serving as the constituting member of the seal portion, it is possible to protect the magnetic encoder without increasing the number of parts and assembling man-hour.

Second Embodiment

Figure 4:
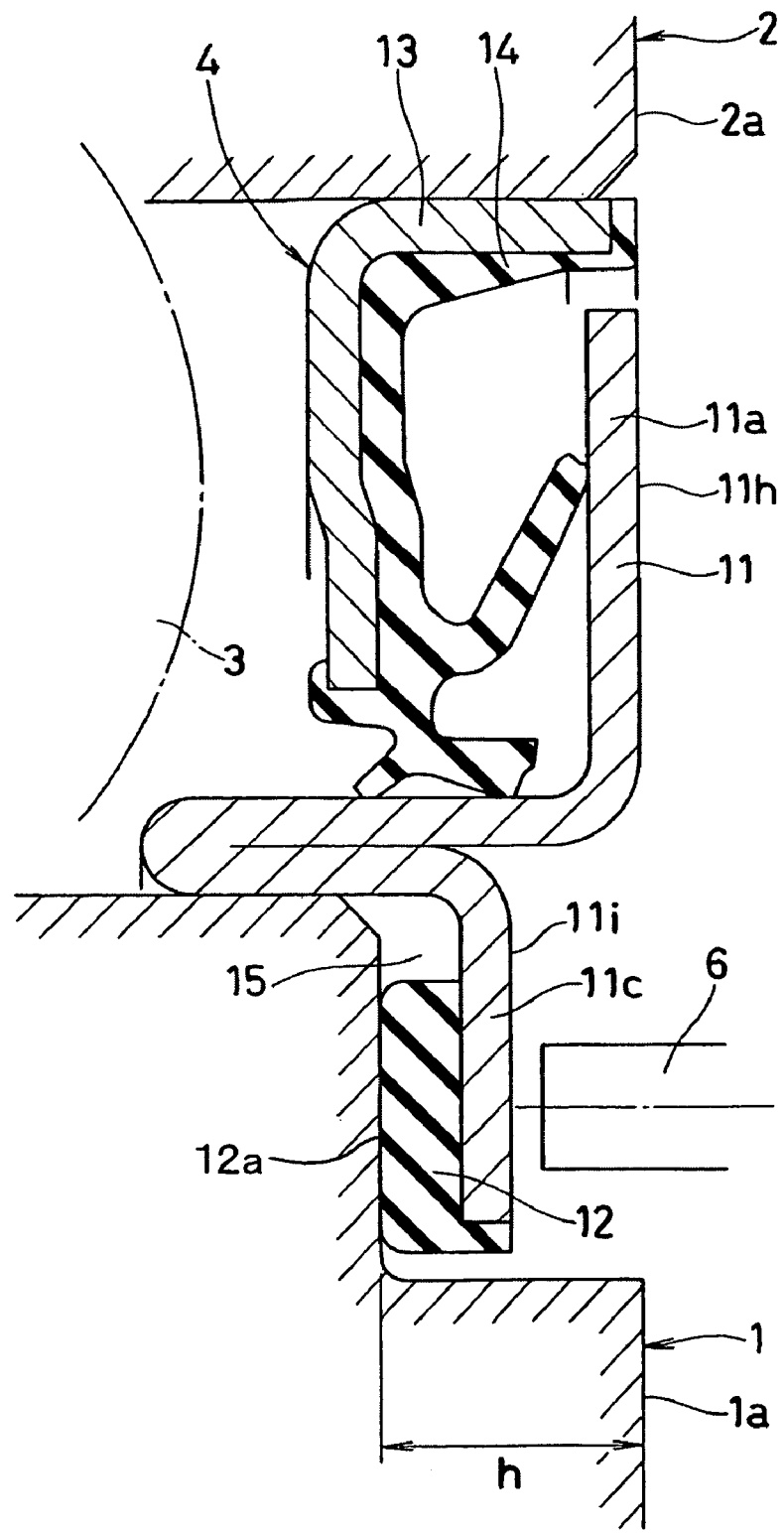
FIG. 4 is a cross sectional view of a sealing device in accordance with a second embodiment of the present invention.

FIG. 4 is a cross sectional view of a sealing device in accordance with a second embodiment of the present invention. As shown in FIG. 4, a sealing device 4 in accordance with the second embodiment is structured by changing a depth h of the recess portion 15 formed in the axial end portion of the shaft 1 in accordance with the first embodiment, and is structured such that an axial position of the outer surface 11i of the protecting diametrical direction portion 11c is arranged at the inner side from the outer surface 11h of the sealing diametrical direction portion 11a, and the axial end surface 1a of the shaft 1 and the axial end surface 2a of the housing 2, and the magnetic sensor 6 is arranged within the recess portion 15.

In this case, in the first embodiment and the second embodiment, the material forming the magnetic encoder 12 may be a synthetic resin such as a plastic or the like in addition to the rubber material.

Further, a shape, a direction, a number and the like of the seal lip which is in slidable contact with the inner surface 11f of the sealing flange portion 11a and the outer diameter surface 11k of the outer diameter portion 11d of the cylinder portion 11b are appropriately selected in accordance with a use condition while taking a sealing performance into consideration.

In accordance with the second embodiment, since the axial position of the outer surface 11i of the one protecting diametrical direction portion 11c is arranged at the inner side in the axial direction from the axial position of the outer surface 11h of the other sealing diametrical direction portion 11a, and the axial positions of the axial end surface 2a of the housing 2 and the axial end surface 1a of the shaft 1, it is possible to arrange the magnetic sensor 6 within the recess portion 15 formed in the axial end portion of the inner member 1, and it is possible to protect the magnetic sensor as well as the encoder from muddy water, a foreign material and the like.

Third Embodiment

Figure 5:
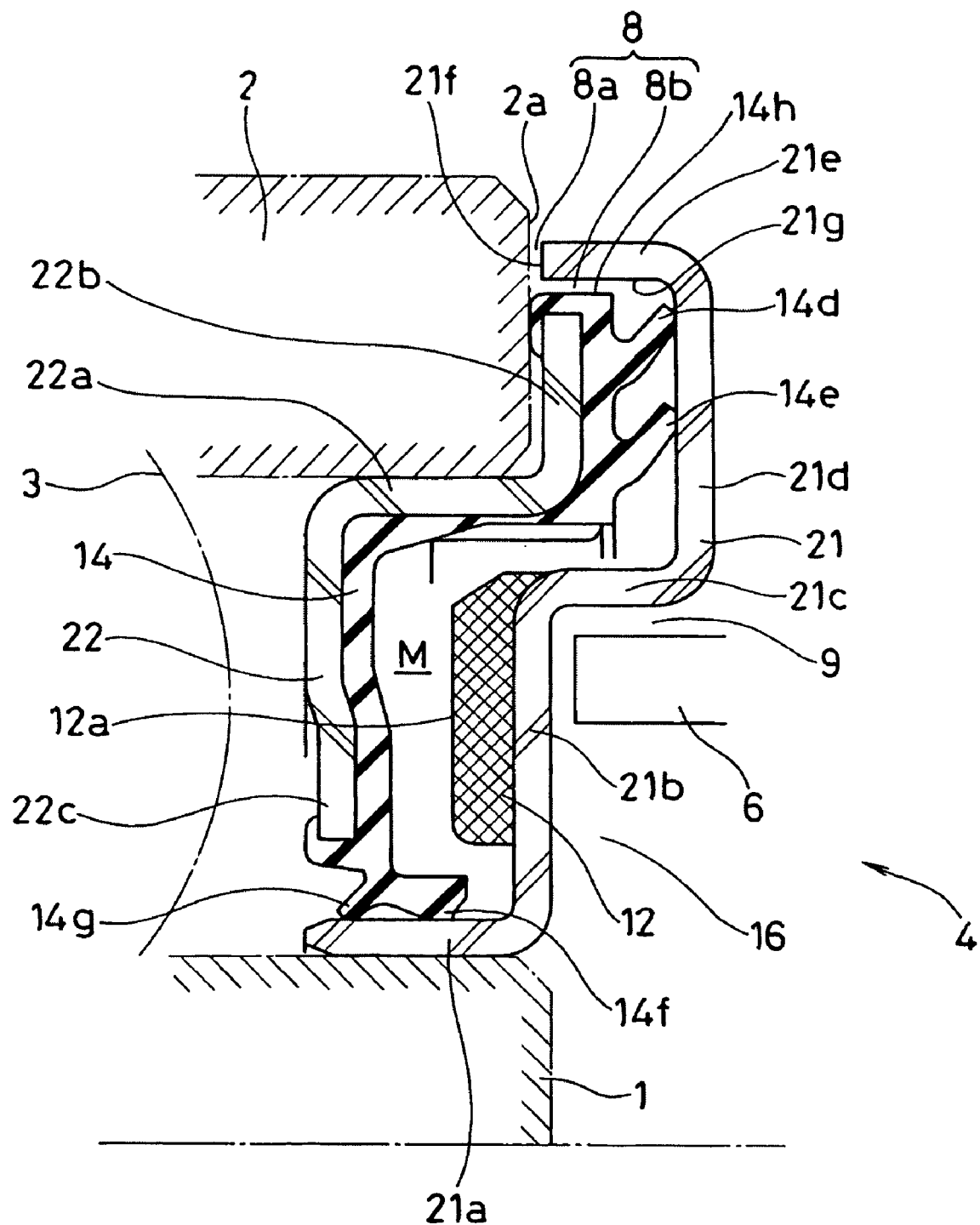
FIG. 5 is a cross sectional view of a sealing device in accordance with a third embodiment of the present invention.

FIG. 5 is a cross sectional view of a sealing device 4 in accordance with a third embodiment of the present invention.

The sealing device 4 in accordance with the present embodiment is a sealing device provided with a magnetic encoder capable of detecting a rotation of two relatively rotating members, and can be employed, for example, in a rotating part of a motor vehicle, an electrical appliance, an industrial machinery, a bicycle or the like. Further, in the case of being applied to the motor vehicle, the sealing device 4 can be preferably used in a hub bearing unit with an ABS vehicle speed sensor, for example, as a hub seal with a magnetic encoder for sealing a gap between a hub bearing unit (housing) and a drive shaft.

As shown in FIG. 5, the sealing device 4 is structured such as to seal an annular gap between a housing 2 serving as the other member in two members provided so as to be rotatable relatively to each other coaxially, and a shaft 1 serving as one member inserted into an axial hole of the housing 2, and is provided with a first annular member 21 fitly attached to the shaft 1, a magnetic encoder 12 formed by baking on the first annular member 21, a second annular member 22 fitly attached to the housing 2, and a seal member 14 formed by baking on the second annular member 22.

The first annular member 21 is structured by a non-magnetic material having a multistage bent shape, and is constituted by an axial direction portion (a cylinder portion) 21a fitly attached to the shaft 1, a diametrical direction portion (a flange portion) 21b extending in the outward diametrical direction from an outer side end portion (no sealed fluid side) of the axial direction portion 21a, an axial direction portion 21c extending to the outer side in the axial direction from a outer diameter side end portion of the diametrical direction portion 21b, a diametrical direction portion 21d extending in the outward diametrical direction from an outer side end portion of the axial direction portion 21c, and an axial direction portion 21e extending to the inner side in the axial direction from an outer diameter side end portion of the diametrical direction portion 21d.

The magnetic encoder 12 is made, for example, of a magnetized rubber material, in which a ferrite (iron) is dispersed, is formed by baking on a surface in an inner side (sealed fluid side) of the diametrical direction portion 21b of the first annular member 21 fitly attached to the shaft 1.

FIG. 3 is a schematic view for explaining the magnetic encoder 12, and shows the state in which the magnetic encoder 12 is seen in the axial direction from an inner side (from the seal member 14) in FIG. 5.

The magnetic encoder 12 is formed as multi magnetic poles in which magnetic poles N, S are alternated in the circumferential direction, as shown in FIG. 3 so as to structure a detected portion 12a. A change of magnetization (magnetic field) generated from the detected portion 12a of the rotating magnetic encoder 12 is sensed by the magnetic sensor 6 serving as a detecting means constituted by a magnetic resistance effect element or the like, and a rotating speed or the like is detected.

The magnetic sensor 6 is provided so as to face to the detected portion 12a of the magnetic encoder 12, which is arranged in the inner side of the first annular member 21, via the first annular member 21. In other words, the magnetic sensor 6 is provided in an outer side in the axial direction than the detected portion 12a of the magnetic encoder 12 (outer side than the diametrical direction portion 21b), and is held to the housing 2 side.

In this case, in the present embodiment, the magnetic sensor 6 is provided so as to be close to the diametrical direction portion 21b and the axial direction portion 21c. It is possible to protect the magnetic sensor 6 by forming a recess portion 16 by the diametrical direction portion 21b and the axial direction portion 21c in the first annular member 21 so as to be depressed in the axial direction, and arranging the magnetic sensor 6 in the recess portion 16, as mentioned above.

Further, it is possible to securely protect the magnetic sensor 6 from a foreign material, muddy water and the like intruding from the outer peripheral side, by arranging the magnetic sensor 6 and the axial direction portion 21c close to each other and arranging the micro gap 9 between the magnetic sensor 6 and the axial direction portion 21c.

In this case, the axial direction portion 21c protects the magnetic sensor 6 by the recess portion 16 formed by the axial direction portion 21c, is not necessarily provided in parallel to the axial direction as illustrated, and may be inclined with respect to the axial direction as far as including a component in the axial direction.

The second annular member 22 is formed in a multistage bent shape similarly to the first annular member 21, and is constituted by an axial direction portion 22a fitly attached to the housing 2, a diametrical direction portion 22b extending in the outward diametrical direction from an outer side end portion of the axial direction portion, and a diametrical direction portion 22c extending in the inward diametrical direction from an inner side end portion of the axial direction portion 22a.

The seal member 14 is formed by baking on an outer diameter side end portion of the diametrical direction portion 22b, an outer side of the diametrical direction portion 22b, an inner diameter side of the axial direction portion 22a, an outer side of the diametrical direction portion 22c, and an inner diameter side end portion of the diametrical direction portion 22c.

The outer side of the diametrical direction portion 22b is provided with seal lips 14d and 14e extending toward the outer side and in the outward diametrical direction, and the seal lips 14d and 14e are slidably in contact with sealing effect with the end surface in the inner side of the diametrical direction portion 21d of the first annular member 21. Further, the inner diameter side end portion of the diametrical direction portion 22c is provided with seal lips 14f and 14g extending to the inner diameter side in the outer side, and the seal lips 14f and 14g are slidably in contact with sealing effect with (the outer diameter side of) the axial direction portion 21a of the first annular member 21.

The seal lips 14d, 14e, 14f and 14g formed by baking on the second annular member 22 are brought into contact with sealing effect with the axial direction portion 21a and the diametrical direction portion 21d of the first annular member 21 as mentioned above, whereby a sealed region M is formed. Accordingly, it is possible to inhibit intrusion of dust from the external, and it is possible to inhibit flowing out of grease from the internal. Further, since it is possible to fill grease in the sealed region M so as to keep the grease in the sealed region M, it is possible to inhibit intrusion of muddy water from the external.

In this case, the seal lips 14d, 14e, 14f and 14g are not limited to the shape shown in FIG. 5, and can be set appropriately to a preferable shape. Further, the number of the seal lips is two each (the seal lips 14d and 14e and the seal lips 14f and 14g) in the present embodiment, however, is not limited to this, but can be appropriately set. Further, in the present embodiment, the seal lip is provided in the second annular member 22 and is slidably in contact with sealing effect with the first annular member 21, however, is not limited to this, but may be provided in the first annular member 21 and be slidably in contact with sealing effect with the second annular member 22, or the former and the latter may be mixed.

Further, since the magnetic encoder 12 formed by baking on the first annular member 21 is arranged within the sealed region M, it is possible to protect the magnetic encoder 12, particularly, the detected portion 12a. Since the detected portion 12a is not in the exposed state by protecting the detected portion 12a, it is possible to prevent the detected portion 12a from being directly affected by the disturbance caused by a foreign material in the external, muddy water, an external magnetic field and the like, it is possible to supply stable magnetic force, and it is possible to improve detecting precision by the detecting means.

Further, in the present embodiment, a labyrinth seal portion 8 is provided in the outer side than the seal lips 14d and 14e. In this case, a seal portion for sealing an annular gap between two members is structured by the seal lips 14d and 14e and the labyrinth seal portion 8.

The labyrinth seal portion 8 is constituted by a micro space 8a formed by an inner side leading end 21f of the axial direction portion 21e of the first annular member 21 and an axial outer side end portion 2a of the housing 2, and a micro space 8b formed by an inner peripheral surface 21g of the axial direction portion 21e of the first annular member 21 and an outer diameter side end portion 14h of the seal member 14 formed by baking on an outer diameter side end portion of the diametrical direction portion 22b of the second annular member 22.

It is possible to dramatically improve muddy-water-proof by arranging the labyrinth seal portion 8 in the outer portion side of the seal lips 14d and 14e as mentioned above.

In this case, in the present embodiment, the sealing device 4 seals the bearing portion, and reference numeral 3 denotes a bearing.

Fourth Embodiment

Figure 6:
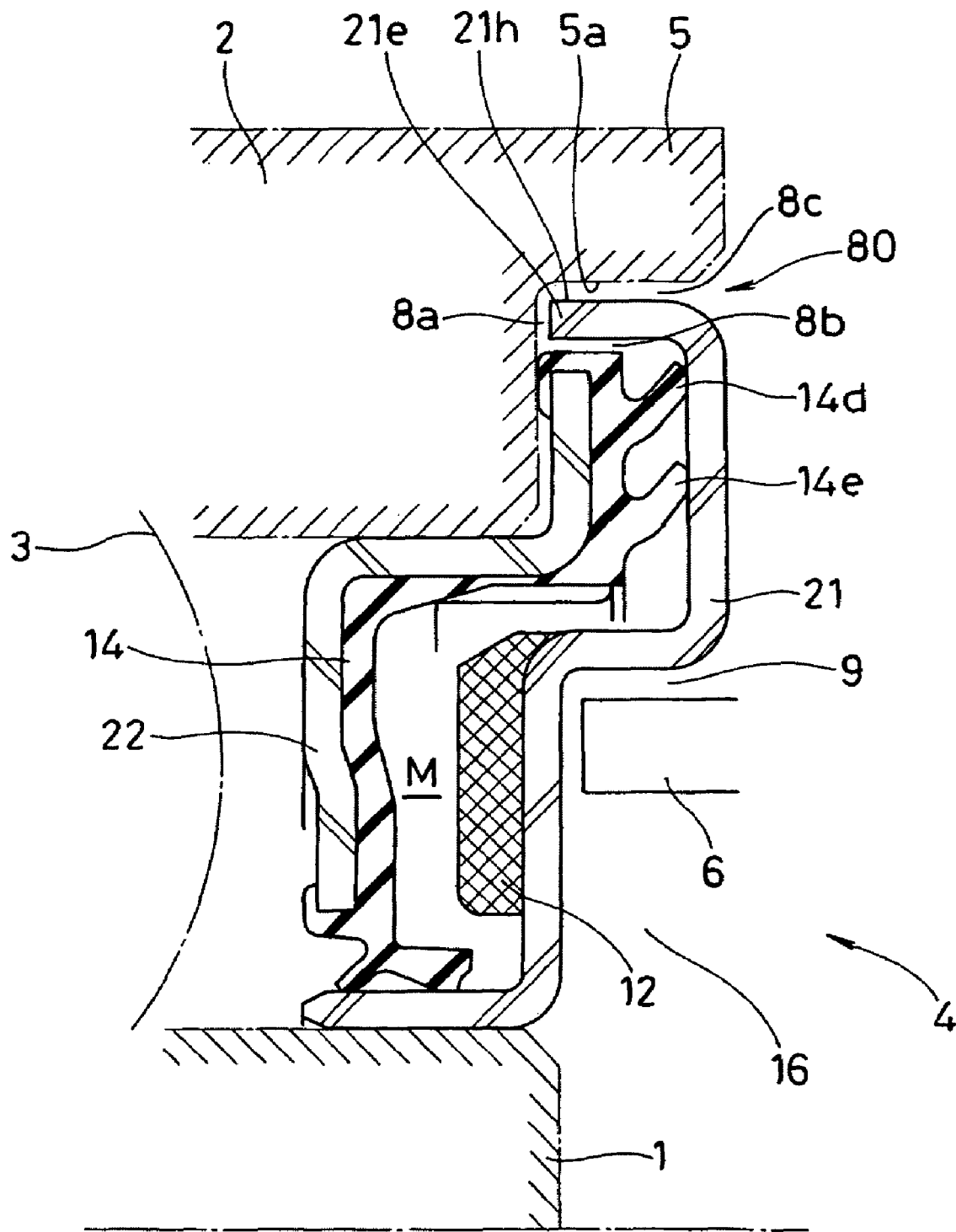
FIG. 6 is a cross sectional view of a sealing device in accordance with a fourth embodiment of the present invention.
Figure 7:
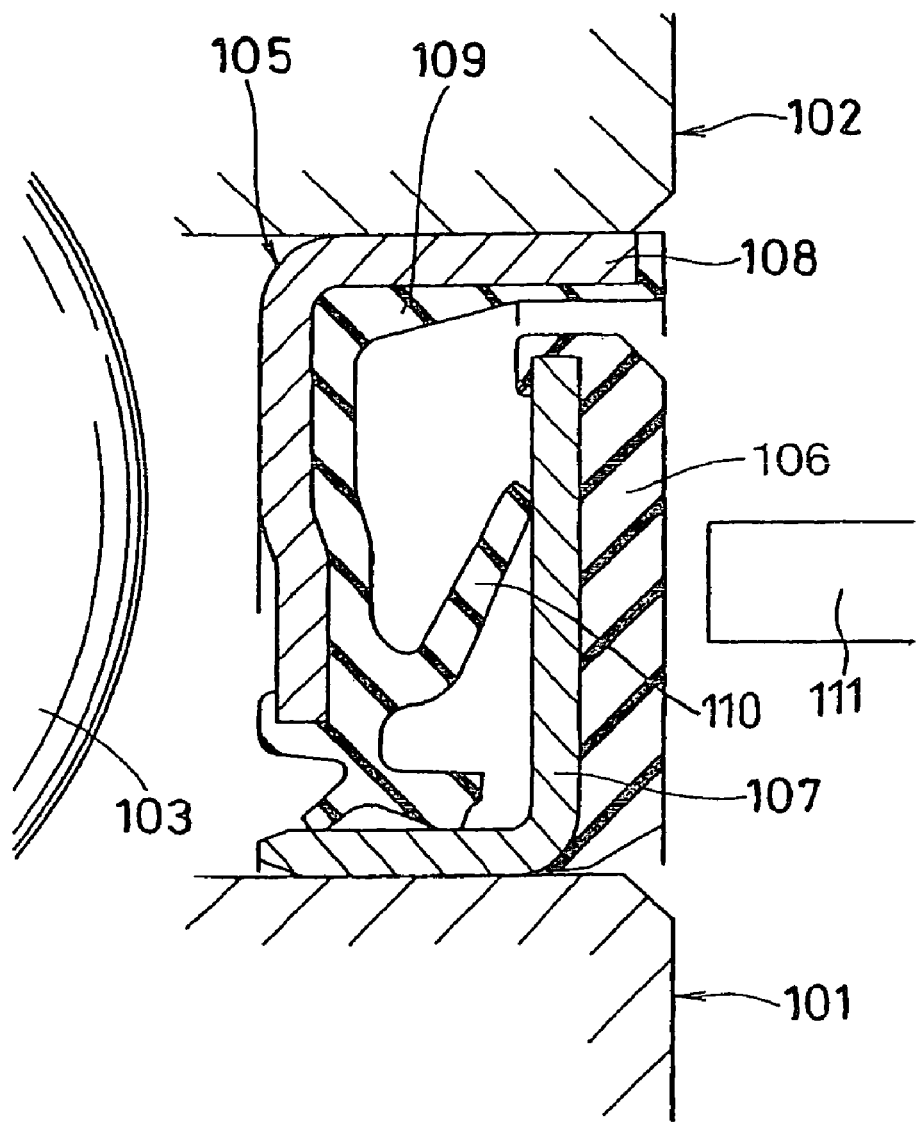
FIG. 7 is a cross sectional view of a sealing device in accordance with a prior art.
Figure 8:
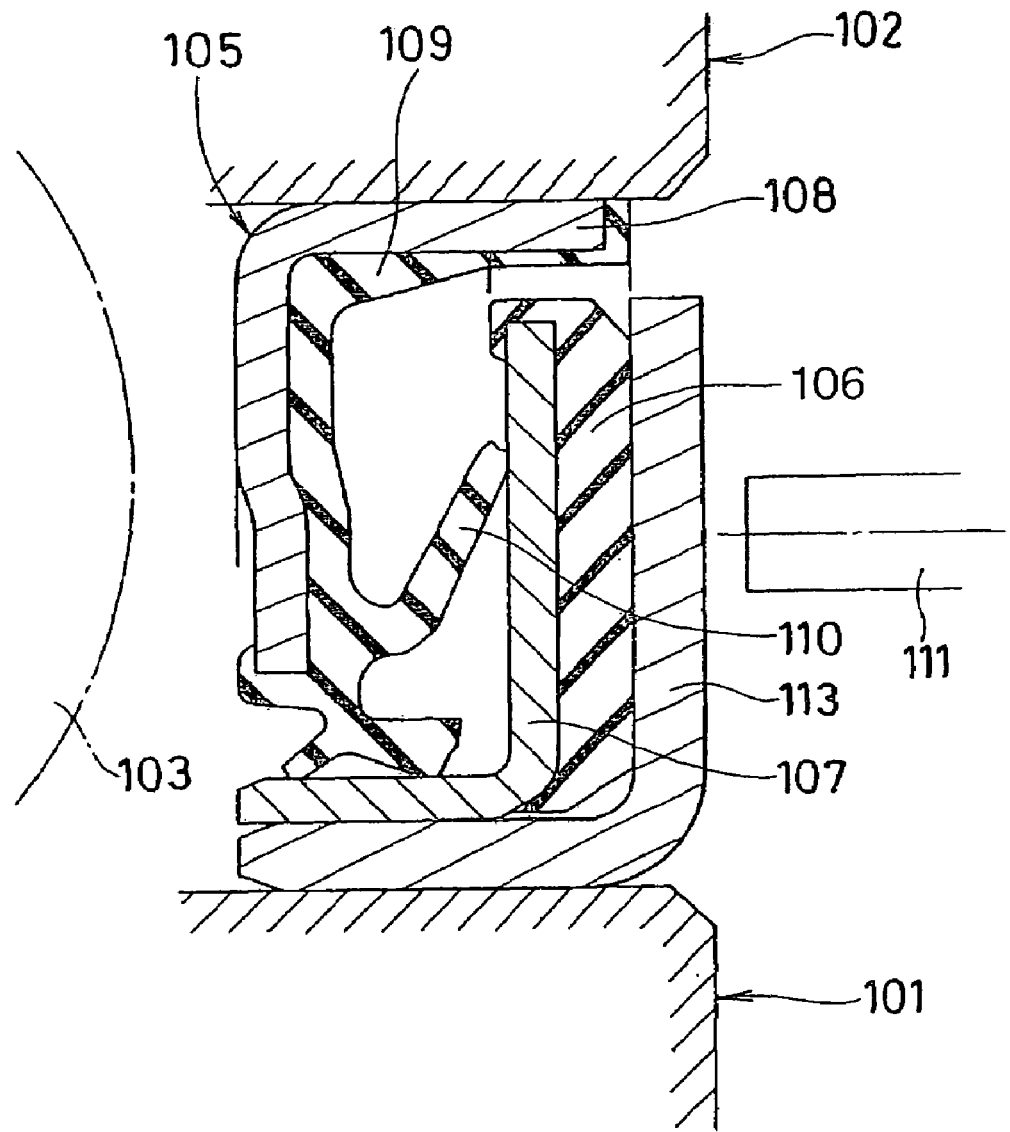
FIG. 8 is a cross sectional view of a sealing device in accordance with another prior art.

FIG. 6 is a cross sectional view of a sealing device in accordance with a fourth embodiment of the present invention. As shown in FIG. 6, in a sealing device 4 in accordance with the fourth embodiment, the number of micro spaces structuring a labyrinth seal portion 80 is increased by changing a shape of the housing 2, in comparison with the labyrinth seal portion 8 shown in the third embodiment. The sealing device 4 shown in FIG. 6 is the same as the sealing device 4 shown in FIG. 5 as the third embodiment, and the same reference numerals are attached to the same constituting portions in FIG. 6 as the structures shown in FIG. 5.

In the labyrinth seal portion 80 shown in FIG. 6, a micro gap 8c formed by an outer peripheral surface 21h of the axial direction portion 21e of the first annular member 21 and an inner peripheral surface 5a of a cylindrical portion 5 in the housing 2 is further provided in addition to the micro gaps 8a and 8b structuring the labyrinth seal portion 8 shown in FIG. 5.

It is possible to dramatically improve muddy-water-PROOF by structuring the labyrinth seal portion 80 as mentioned above.

In this case, in the labyrinth seal portion shown in the third embodiment and the fourth embodiment, the micro gap is formed between the first annular member 21 and the seal member 14 formed by baking on the second annular member 22, and between the first annular member 21 and the housing 2, however, the micro gap may be formed between any one of the seal member 14 and the housing 2, and the first annular member 21.

As mentioned above, in accordance with the third embodiment and the fourth embodiment, since the magnetic encoder 12 is provided within the sealed region M, it is possible to protect the detected portion 12a. Accordingly, it is possible to prevent the detected portion 12a from being directly affected by the disturbance caused by a foreign matter in the external, muddy water, an external magnetic field or the like, it is possible to supply stable magnetic force, and it is possible to improve detecting precision by the detecting means.

Further, since the magnetic sensor 6 is structured such as to be arranged in the outer side than the sealing device 4, it is not necessary that the magnetic sensor 6 is provided in the sealing device 4 itself, so that it is possible to simplify the sealing device. Further, it is possible to protect the magnetic sensor 6 by arranging the magnetic sensor 6 in the recess portion 16 formed by the diametrical direction portion 21b and the axial direction portion 21c. Further, it is possible to securely protect the magnetic sensor 6 from the foreign material, muddy water or the like intruding from the outer peripheral side, by arranging the magnetic sensor 6 and the axial direction portion 21c close to each other.

Further, since the seal portion for sealing the annular gap between the two members is structured by the seal lips 14d and 14e and the labyrinth seal portion 8 provided in the outer side than the seal lips 14d and 14e, it is possible to dramatically improve sealing performance, particularly, muddy-water-proof. Accordingly, it is possible to more securely protect the detected portion 12a provided in the inner side, it is possible to prevent the detected portion 12a from being directly affected by the disturbance caused by a foreign material in the external, muddy water, an external magnetic field or the like, it is possible to stably supply magnetic force, and it is possible to improve detecting precision by the detecting means.

What is claimed is:

1. A sealing device comprising:
a first annular member attached to any one member of a shaft and a housing which are rotatable relative to each other coaxially;
a second annular member attached to the other member of said shaft and said housing;
a seal portion provided between said first and second annular members and sealing an annular gap between said two members, said seal portion including at least one seal lip, another at least one seal lip and a labyrinth seal portion;
a magnetized detected portion, to be detected by a detecting means provided in a no sealed fluid side, being provided in a sealed fluid side of said first annular member, whereby a relative rotation of said two member is detected, and
an arrangement of said at least one seal lip, said magnetized detected portion, said another at least one seal lip and said labyrinth seal portion being progressively arranged in a radially outward direction from said shaft.

2. A sealing device (4) as claimed in claim 1, wherein said first annular member (11) has an axial direction portion (11b) fitly attached to said one member (1) and diametrical direction portions (11a and 11c) extending in the inward diametrical direction and in the outward diametrical direction in the no sealed fluid side from said axial direction portion (11b), and is made of a non-magnetic material, any one diametrical direction portion (11a or 11c) of said diametrical direction portions (11a and 11c) supports said detected portion (12a) arranged in a recess portion (15) formed in an axial end portion of said one member (1) in the sealed fluid side, and said other diametrical direction portion (11c or 11a) is brought into contact with sealing effect with a seal lip (14a) of said seal portion fixed to said second annular member (13).

3. A sealing device (4) as claimed in claim 1, wherein said first annular member (11) has an axial direction portion (11b) fitly attached to said one member (1) and diametrical direction portions (11a and 11c) extending in the inward diametrical direction and in the outward diametrical direction in the no sealed fluid side from said axial direction portion (11b), and is made of a non-magnetic material, any one diametrical direction portion (11a or 11c) of said diametrical direction portions (11a and 11c) supports said detected portion (12a) arranged in a recess portion (15) formed in an axial end portion of said one member (1) in the sealed fluid side, and said other diametrical direction portion (11c or 11a) is brought into contact with sealing effect with a seal lip (14a) of said seal portion fixed to said second annular member (13), and
wherein an axial position of an outer surface of said one diametrical direction portion (11a or 11c) supporting said detected portion (12a) in the sealed fluid side is positioned in the sealed fluid side from an axial position of an outer surface of said other diametrical direction portion (11c or 11a).

4. A sealing device (4) as claimed in claim 1, wherein said first annular member (11) has an axial direction portion (11b) having a fold-back portion fitly attached to said one member (1) and diametrical direction portions (11a and 11c) extending in the inward diametrical direction and in the outward diametrical direction in the no sealed fluid side from said axial direction portion (11b), and is made of a non-magnetic material, any one diametrical direction portion (11a or 11c) of said diametrical direction portions (11a and 11c) supports said detected portion (12a) arranged in a recess portion (15) formed in an axial end portion of said one member (1) in the sealed fluid side, and said other diametrical direction portion (11c or 11a) is brought into contact with sealing effect with a seal lip (14a) of said seal portion fixed to said second annular member (13).

5. A sealing device (4) as claimed in claim 1, wherein said first annular member (11) has an axial direction portion (11b) having a fold-back portion fitly attached to said one member (1) and diametrical direction portions (11a and 11c) extending in the inward diametrical direction and in the outward diametrical direction in the no sealed fluid side from said axial direction portion (11b), and is made of a non-magnetic material, any one diametrical direction portion (11a or 11c) of said diametrical direction portions (11a and 11c) supports said detected portion (12a) arranged in a recess portion (15) formed in an axial end portion of said one member (1) in the sealed fluid side, and said other diametrical direction portion (11c or 11a) is brought into contact with sealing effect with a seal lip (14a) of said seal portion fixed to said second annular member (13), and
wherein an axial position of an outer surface of said one diametrical direction portion (11a or 11c) supporting said detected portion (12a) in the sealed fluid side is positioned in the sealed fluid side from an axial position of an outer surface of said other diametrical direction portion (11c or 11a).

6. The sealing device as claimed in claim 1, wherein said seal portion further includes:
the at least one seal lip and the another at least one seal lip are provided in at least any one of said first and second annular members, and are brought into contact with sealing effect with at least the other of said first and second annular members; and
a micro space provided in the no sealed fluid side, and formed by said first annular member is positioned close to at least any one of said second annular member and said other member.

7. The sealing device as claimed in claim 1, wherein said one member is provided in an inner peripheral side of said other member, and said seal portion further includes:
said another at least one seal lip provided in at least any one of said first and second annular members, and brought into contact with sealing effect with at least the other of said first and second annular members; and
a micro space provided in the no sealed fluid side and formed by said first annular member is positioned close to at least any one of said second annular member and said other member, and
said first annular member is provided with an axial direction portion arranged close to said detecting means, in an outer peripheral side from said detecting means.

8. The sealing device as claimed in claim 1, wherein the labyrinth seal portion includes two micro spaces separating one of said first and second annular members from the one member.

9. The sealing device as claimed in claim 1, wherein the labyrinth seal portion includes three micro gaps separating one of said first and second annular members from the one member.

* * * * *